(Model.)

W. H. VAN WART.
NUT LOCK.

No. 385,889. Patented July 10, 1888.

WITNESSES:
J. H. Garfield,
C. Sedgwick.

INVENTOR:
W. H. Van Wart.
BY Munn & Co.
ATTORNEYS.

UNITED STATES PATENT OFFICE.

WILLIAM H. VAN WART, OF STONINGTON, CONNECTICUT.

NUT-LOCK.

SPECIFICATION forming part of Letters Patent No. 385,889, dated July 10, 1888.

Application filed March 8, 1888. Serial No. 266,546. (Model.)

*To all whom it may concern:*

Be it known that I, WILLIAM H. VAN WART, of Stonington, in the county of New London and State of Connecticut, have invented a new and Improved Valve-Nut Lock, of which the following is a full, clear, and exact description.

The invention relates to devices for preventing the accidental turning of the packing-nuts of valves in the operation of the same; and the object of the invention is to provide a device of this character of cheap construction and easy of application.

Reference is to be had to the accompanying drawings, forming a part of this specification, in which similar letters of reference indicate corresponding parts in both the figures.

Figure 1:
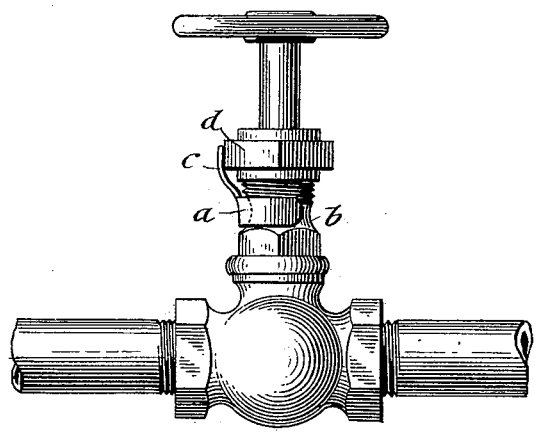
Figure 2:

Figure 1 is a perspective view of a valve, showing one of my improved locking devices applied; and Fig. 2 is a like view, enlarged, of the locking device.

The open or split ring $a$ of the lock is preferably formed of spring metal, which is adapted to be clamped on the neck or shank $b$ of the valve-bonnet. A rigid arm, $c$, projects from the ring at one side thereof and extends in the direction of the bore of the ring, and is slightly offset to accommodate the packing-nut $d$ of the valve. The lock may be struck up from light material and with little trouble. The lock is sprung on the bonnet-shank $b$ so that the arm $c$ will lie flat against one side of the polygonal packing-nut.

The clamping action of the ring will suffice to prevent the nut turning with the valve-stem, but may be readily removed when the valve is to be repacked.

As all valves of the general description of that shown are formed with like bonnet shanks or necks, no inconvenience is experienced in applying the nut-lock.

Having thus described my invention, what I claim as new, and desire to secure by Letters Patent, is—

As a new article of manufacture, the device for locking valve-nuts, the same consisting of the spring band or ring $a$, divided transversely, as shown, and the rigid arm $c$, extending vertically, or nearly so, from one side of said band, substantially as specified.

WILLIAM H. VAN WART.

Witnesses:
J. L. MCAULIFFE,
EDGAR TATE.